Figure 1:
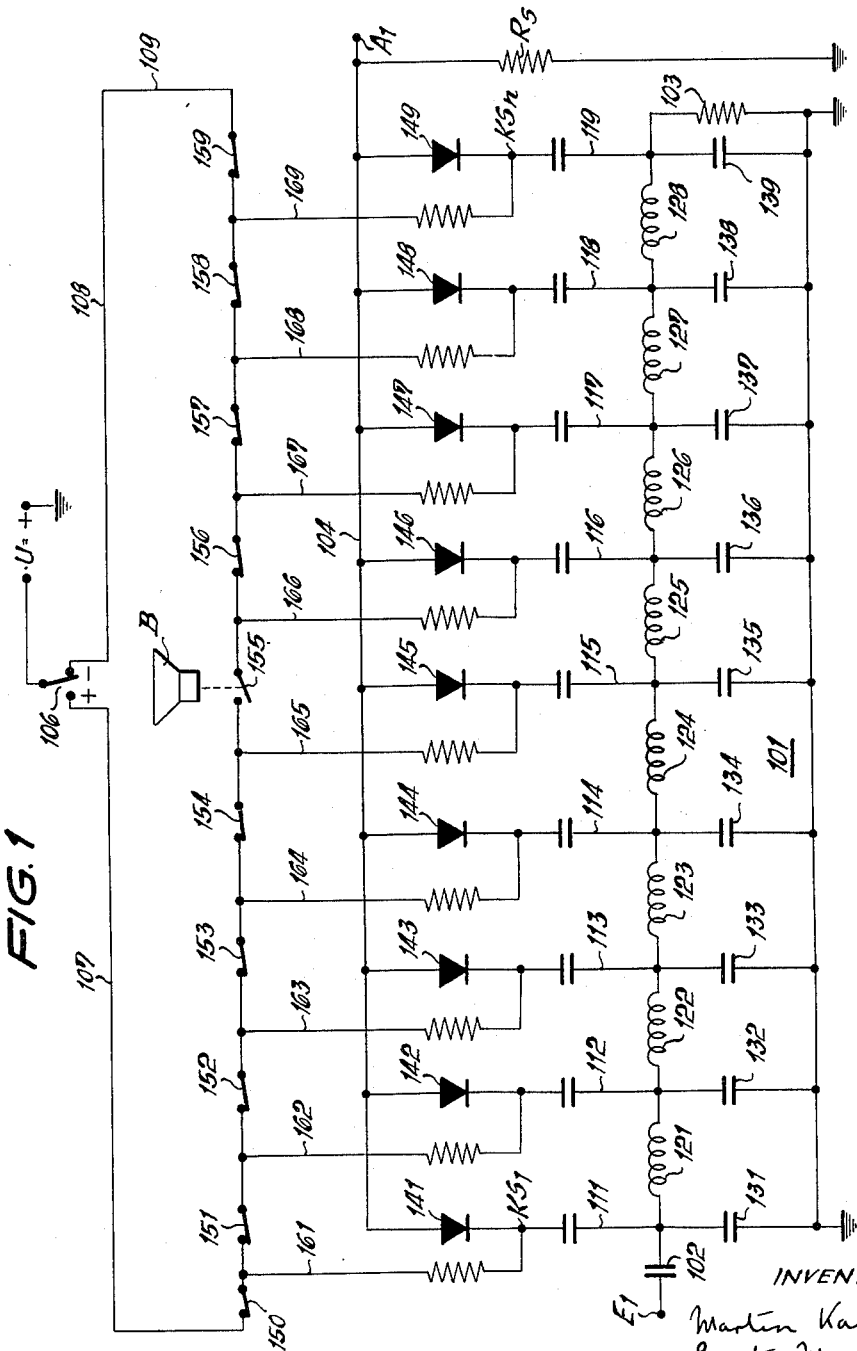

Sept. 19, 1961 M. KASSEL ET AL 3,001,137
PROCESS FOR GENERATING SERIES OF ELECTRICAL PULSES WITH
A SELECTABLE NUMBER OF INDIVIDUAL PULSES
Filed June 11, 1956 7 Sheets-Sheet 2

FIG. 2

INVENTORS.
Martin Kassel
Gunter Martens
Hans-Joachim Hildenbrand
BY Michael S. Striker
attorney

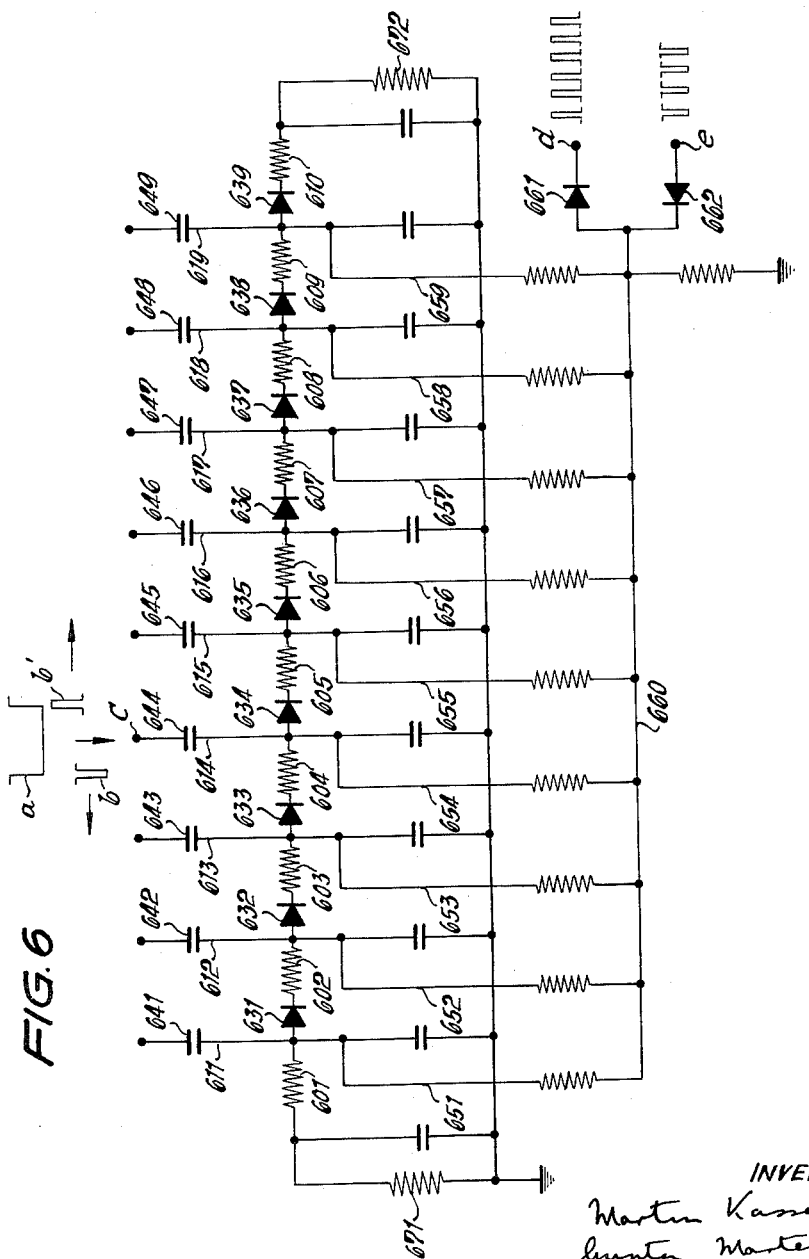

United States Patent Office 3,001,137
Patented Sept. 19, 1961

3,001,137
PROCESS FOR GENERATING SERIES OF ELECTRICAL PULSES WITH A SELECTABLE NUMBER OF INDIVIDUAL PULSES
Martin Kassel, Berlin-Charlottenburg, Günter Martens, Schliersee, Upper Bavaria, and Hans Joachim Hildenbrand, Berlin-Steglitz, Germany, assignors to Keinzle Apparate G.m.b.H., Villigen, Black Forest, Germany
Filed June 11, 1956, Ser. No. 590,663
Claims priority, application Germany June 13, 1955
22 Claims. (Cl. 328—38)

The invention relates to a device for generating series of electrical pulses with a selectable number of individual pulses, as they are required for the electronic operation of counters, selectors and other devices, and especially for electronic computers.

The invention also refers to such device for the generation of series of electrical pulses in which the pulse series are generated by multiplying single or multiple primary pulses by a selectable, whole number factor.

For this purpose the invention makes use of so-called delay circuits, that are circuits comprising one or several circuit members connected in series and other current carrying means, in which the forward travel through the delay circuit of any pulses introduced at one end or point thereof is delayed. Such delay circuits are for instance LC-stages, delay cables and others.

The required multiplication of the pulses introduced into the relay circuit or delay line is obtained by arranging tapping or junction points along the delay line, the number of which corresponds to the highest possible digit value of the multiplication factor and which are connected to an output line via non-reactive or at least very little reactive branch lines so that the selected series of pulses or the complementary number of pulses can be taken off at the ends of the output line.

It is the object of the invention to provide a device by means of which it is possible to control the number of pulses that are to reach the output line from the delay line or to be taken off at the end of the output line in a particularly simple and reliable manner. For this purpose the delay line or its in- or output lines shall be selectably controlled by substantially electronic, preferably purely electronic control means.

It is a further object of the invention that the single or multiple primary pulses shall be introduced into the delay line at one end thereof so that they will proceed through the whole of said line passing through every single delay member, the branch lines leading from the junction or tapping points to the output line being rendered effective consecutively by being influenced by voltages rendering the same conductive or non-conductive, respectively, so that only that number of branch lines leading to the output line will become conductive which corresponds to a selected digit value of the multiplication factor. A further, specially simple device embodying the invention consists in an arrangement wherein the single or multiple primary pulses can be introduced into additional, selectable branch lines of the delay line so that they will only pass through that number of delay members of the whole line which corresponds to a selected digit value of the multiplication factor, thereby defining the number of pulses to be delivered at the end of the output line.

Below various embodiments of the invention will be explained with reference to the accompanying drawings.

The drawings show in

Figure 3:
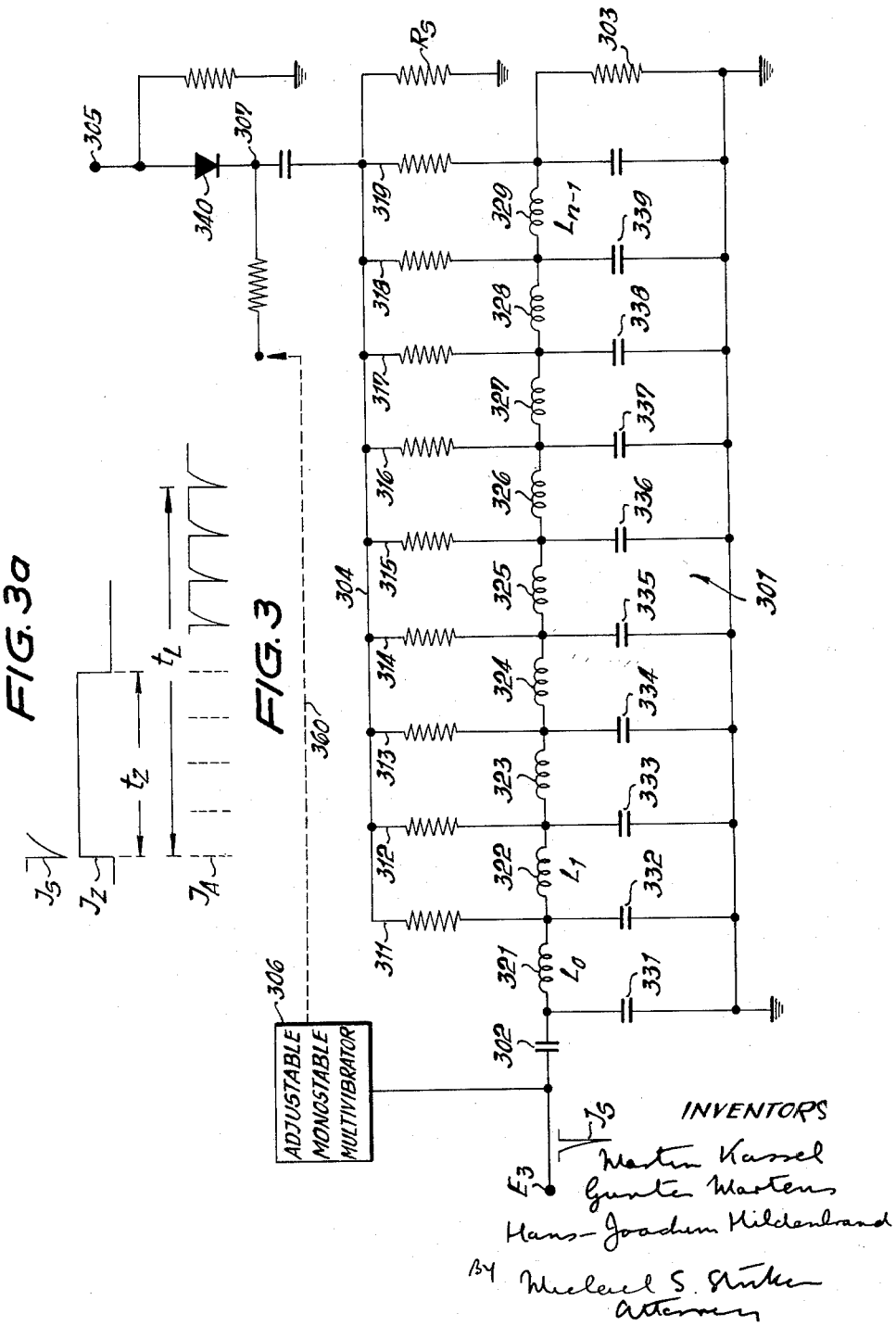
Figure 4:
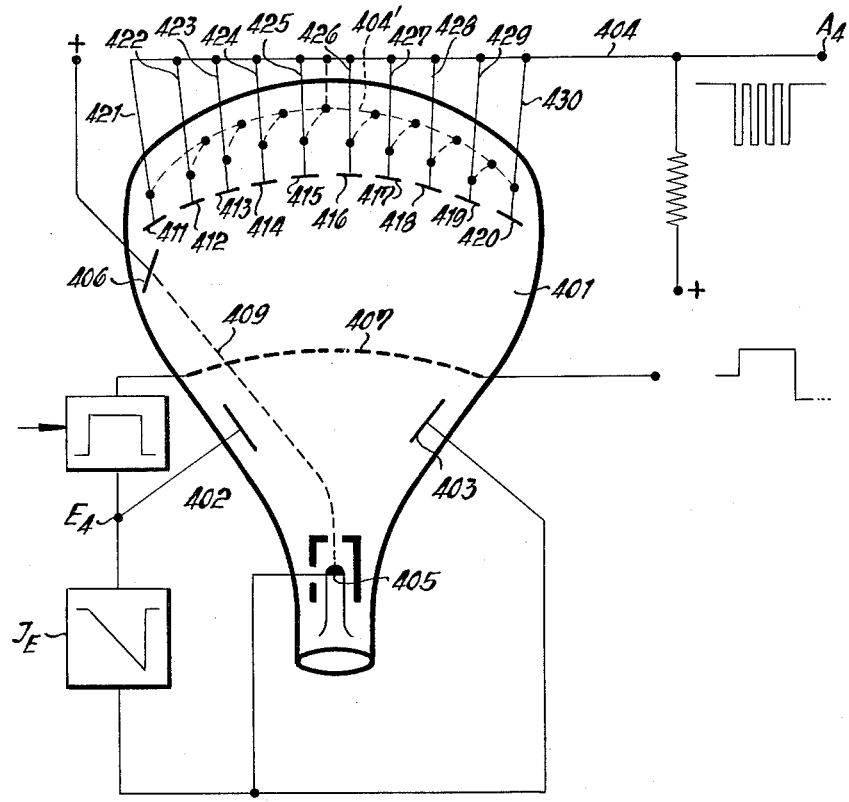
Figure 4A:
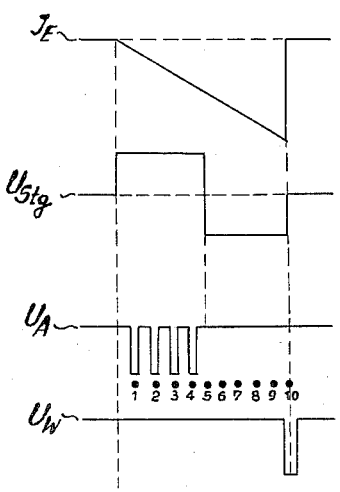
Figure 5:
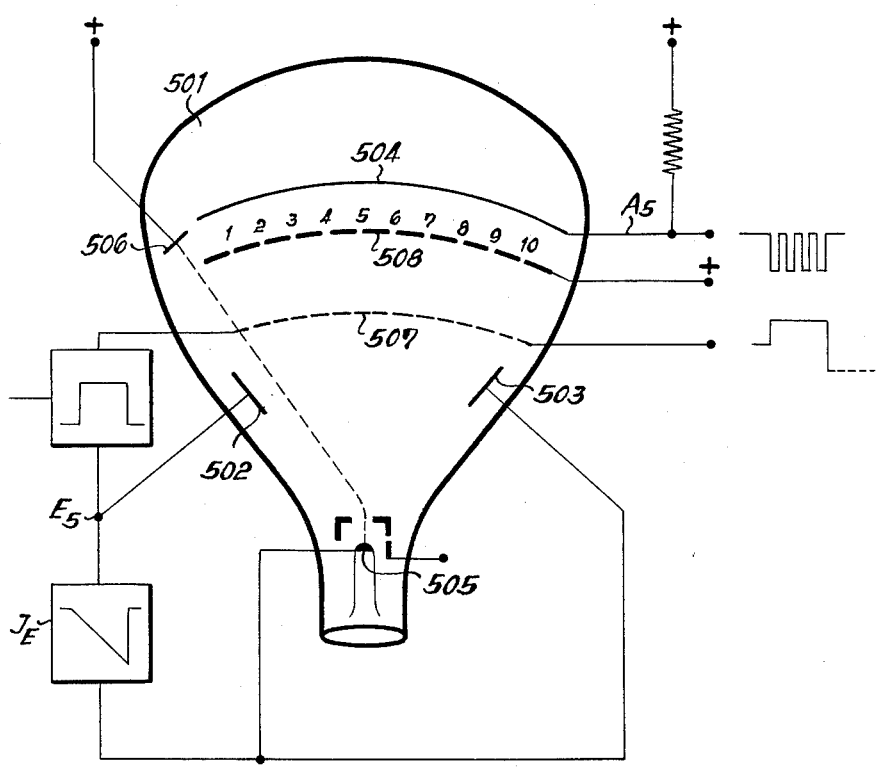
Figure 5A:
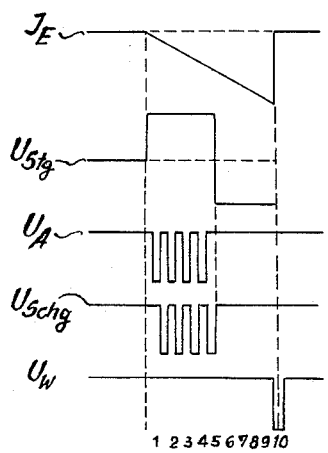
Figure 7:
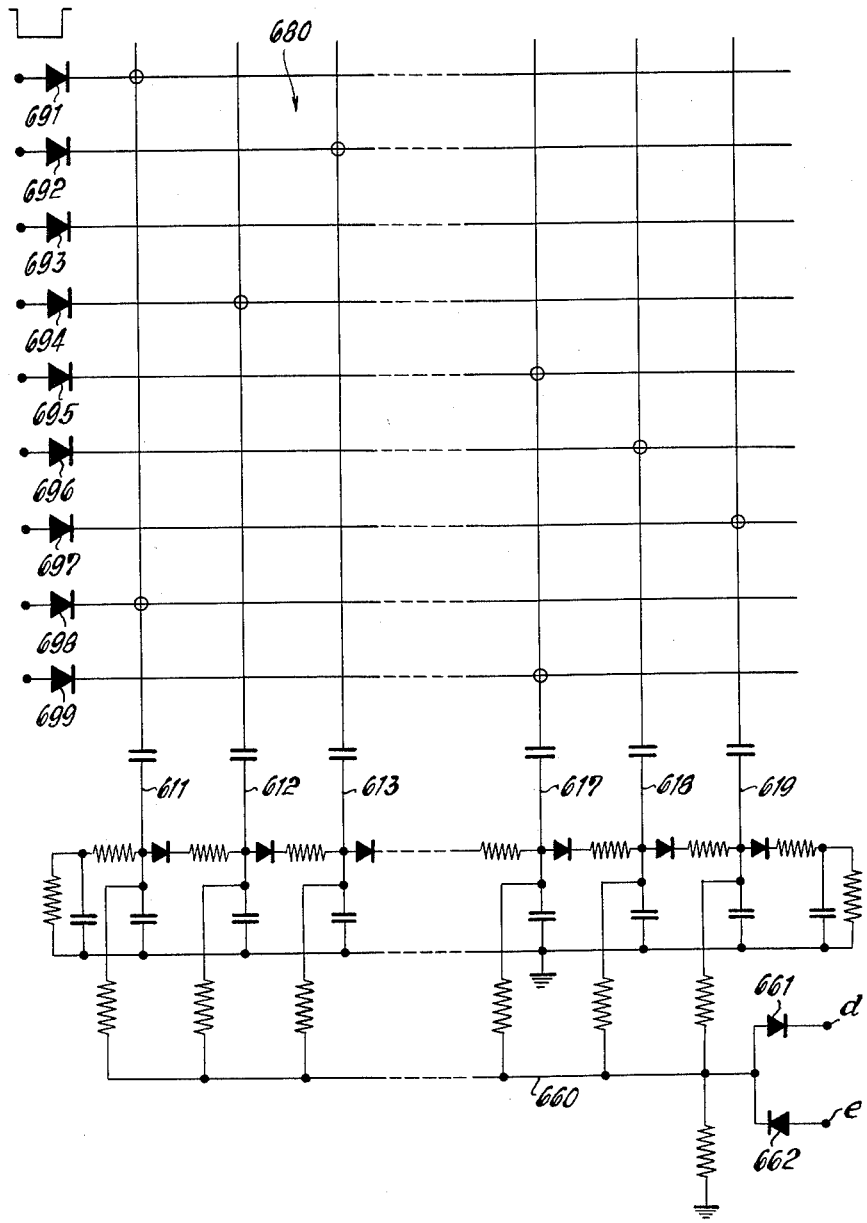

FIG. 1 a delay line with branch lines to be individually influenced by application of a D.C. voltage, FIG. 2 a delay line with branch lines to be influenced by a sawtooth pulse of adjustable shape, FIG. 3 a delay line with branch lines to be influenced by a control pulse of adjustable width, FIG. 3a a pulse diagram relating thereto, FIG. 4 an electron beam deflector tube with individual anodes connected to a common output line and with a control grid to be influenced by pulses of adjustable effect, FIG. 4a a pulse diagram relating thereto, FIG. 5 an electron beam deflector tube with a common anode, a slotted grid, and a control grid to be influenced by pulses of adjustable effect, FIG. 5a a pulse diagram relating thereto, FIG. 6 a delay line with additional branch lines for introducing the original pulses to be multiplied, FIG. 7 the same delay line as that of FIG. 6 in connection with an arrangement of sets of bus bars crossing each other.

The embodiment shown in FIG. 1 consists of a delay line 101 having $n$, for instance 9 members, and an input condenser 102 for the introduction of the individual pulse $E_1$ to be multiplied. The delay line is terminated by a resistance 103. It is connected to the output line 104 via $n$, for instance 9 non or little reactive lines 111—119. At the end $A_1$ of the output line 104 a selectable number of output pulses can be taken off. The individual members of the delay line 101 have been shown by way of example as consisting of the inductances 121 to 128 and the capacities 131 to 139.

The branch lines 111 to 119 leading to the output line 104 can be considered as non-reactive due to the insertion of condensers of small capacity. They are blocked against reaction to a bias voltage U. Inserted in the branch lines 111 to 119 are electronic control members in the form of $n$, for instance 9 diodes 141 to 149, the conductivity of which is controlled by the bias voltage U. A positive or negative bias voltage U is applicable to the electronic control members, the diodes 141 to 149, from a suitable voltage supply alternatively by operation of a change-over switch 106, two leads 107 and 108, and a lead 109 which latter may be interrupted in selectable places by operation of numbered press button switches 150 to 159 and branch lines 161 to 169, respectively, connected to the lead 109 between the individual press button switches. One button B is shown diagrammatically connected with opened switch 155. The voltage U as applied will temporarily either block the electronic control members 141 to 149 or make them conductive. Depending on the actual position of the switch 106, on the selection of the press button switches 150 to 159 opened and on the amount of bias voltage applied to the diodes 141 to 149 a selectable number of these diodes can be made conductive or blocked, thereby defining the number of pulses that may be taken off the output line 104 at the output terminal $A_1$.

In this embodiment the number of pulses to be delivered at $A_1$ is controlled by means of non-electronic switching means, i.e. the switches 150 to 159 which are operated by press buttons B. However, the arrangement chosen in this case has a definite advantage over a known arrangement in which control switches are arranged directly in the output line carrying the high frequency pulses. In the above described arrangement according to the invention the switches 150 to 159 and the branch lines 161 to 169 are completely decoupled from the high frequency pulse circuit, and the control pulses going through the just mentioned lines and can be considered as constant potential pulses as compared with the high frequency pulses to be multiplied.

In the embodiments to be described below the conductivity of the electronic control elements can be controlled by purely electronic means. In the arrangement shown in FIG. 2 an input pulse $E_2$ is introduced into the delay line 201 via an input condenser 202. The line is terminated by a resistance 203 and consists of the inductances 221 to 228 and the condensers 231 to 239. It is connected to an output line 204 over the branch lines 211 to 219 rendered effective consecutively. The lines 211 to 219 contain electronic control means in the form of diodes 241–249 the conductivity of which is adjustable. The time when these diodes are to become conductive is defined by a sawtooth pulse $I_2$ applied to the input terminal 206 of the output line 204. The phase of this pulse is adjusted to that of the input pulse $E_2$ by known means, its duration being defined in relation to the time which the input pulse $E_2$ requires to pass through the whole of the delay line 201. Its slope angle if the sawtooth shape is selectable and according to the chosen slope angle the sawtooth voltage appearing on the output line 204 at a given moment will have a smaller or larger amplitude than the pulses tending to issue from the delay line 201 over the diode lines 211 to 219, respectively, at such moment, so that the corresponding diode will be either conductive or blocked.

In this embodiment (FIG. 2) comprising the branch lines 211 to 219 and the diodes 241 to 249 it is not quite easy to maintain the exact amplitudes required. Therefore the embodiment shown in FIG. 3 will have certain advantages over the one last described.

The delay line 301 of this embodiment consists of the inductances 321 to 329 and the condensers 331 to 339 and is terminated by a resistance 303. By the branch lines 311 to 319 containing in one or both directions high ohmic and therefore little reactive decoupling members in the form of ohmic resistances or inductive reactances, diodes or the like, the delay line 301 is connected to the output line 304. The latter is connected to the output terminal 305 via a diode 340, the conductivity of which is controllable. This diode 340 is controlled by a voltage rendering it either conductive or non-conductive and applied either to the output line 304 itself or via the line 360 to the junction point 307, the wave form and duration of this voltage application depending on the number of branch lines and their times of delay in accordance with the selected number of pulses to be handled.

In this embodiment—see FIGS. 3 and 3a—a negative pulse $I_s$ entering at the input terminal $E_3$ is applied to the monostable multivibrator 306, which produces a rectangular pulse $I_z$ of electronically adjustable duration $t_z$. This pulse influences the diode 340 via the line 360 and thereby blocks the diode 340 during the time $t_z$, so that the pulses reaching the output line 304 from the delay line 301 during this time will remain ineffective. The pulses $I_A$, however, arriving during the time interval $t_L - t_z$ will pass. As may be seen from FIG. 3a by way of example the first five pulses will remain ineffective whereas the last four pulses will pass.

By adjusting the pulse width $t_z$ at the monostable multivibrator 306 the embodiment of the invention just described makes it possible to adjust the timing of the delay line performance exactly to the time requirements of the branch lines 311 to 319, respectively.

The embodiments described herebelow make use of an electron beam deflector tube with for instance nine or ten effective deflecting positions which depending on the wave form and amplitude of the deflecting voltage applied thereto are reached by the beam after corresponding time intervals. These tubes e.g. have nine or ten anodes which are connected to an output line outside the tube. The electron beam being deflected consecutively from one anode to the other operates as a delay line, its consecutively effective positions corresponding to branch lines rendered effective consecutively.

The electron beam deflector tube 401 represented in FIG. 4 has two deflector plates 402 and 403 and ten individual anodes 411 to 420, which are connected to the output line 404 by the lines 421, to 430, respectively.

The output line 404 may be arranged outside the tube 401—shown in full lines—or inside as shown in broken lines. In the latter case the output line 404' must be arranged remote from the plane in which the electrons travel and impinge and must be connected to the individual anodes by oblique conductors so that it may not act as electron target.

Before the sawtooth pulse $J_E$ is applied to the input terminal $E_4$ the electron beam 409 (shown in broken lines) coming from the cathode 405 is directed to a rest anode 406. When the sawtooth pulse $J_E$ is applied to the input $E_4$ the electron beam consecutively sweeps over the individual anodes 411 to 420 and produces a sequence of negative pulses thereon, the number of which depends on the number of anodes impinged upon during the sweep so that the corresponding multiple of the input pulse $J_E$ can be taken off at the output terminal $A_4$ of the output line 404. According to the invention the number of pulses constituting the pulse sequence to be taken off at the exit $A_4$ of the output line is controlled by applying a control voltage (determining the blocking and passing of said pulses) to a control grid 407 of the tube 401, and the duration of the application of the control voltage again corresponds to the time required by the electron beam to sweep over that number of anodes which corresponds to the multiplication factor selected. The pulse diagram according to FIG. 4a shows the example of a linear sawtooth deflector pulse $J_E$ and a control voltage $U_{Stg}$ applied to the control grid 407, which voltage is positive during $4/10$ of the duration of said pulse and negative during the rest of its duration. Therefore, of the possible ten pulses only the first four pulses $U_A$ will be generated at the anodes 411 to 414 and reach the output line 404 from there.

In FIG. 4a a further pulse $V_W$ is illustrated which may be derived, as shown, from the trailing flank of the sawtooth pulse $J_E$ and used as a control pulse for other subsequent operations.

In the embodiment shown in FIG. 5 there is again an electron beam deflector tube 501 with two deflector plates 502 and 503 and a common anode 504 being arranged inside the tube and having the effect of an output line. Also there is a cathode 505, a rest anode 506 and a control grid 507. In contrast with the arrangement in the embodiment previously described the tube 501 has a slotted grid 508 with ten slots of even width, whereas the individual anodes have been omitted. When being deflected by a sawtooth pulse $J_E$ applied to the input terminal $E_5$ of the deflector plate 502, the sweeping electron beam 509 shown in dotted lines sequentially and alternatively passes the slots and is stopped by the solid parts between the slots of the slotted grid 508, and thus produces a sequence of pulses on the common anode 504 as the beam sequentially passes th slots, such pulses being delivered at the output terminal $A_5$.

As may be seen from the example illustrated by FIG. 5a there will be four output pulses $U_A$ that are delivered from at the common anode 504 and four pulses $U_{Schg}$ somewhat offset in time which may be taken off the slotted grid 508, the number of these pulses (e.g. 4) corresponding to the width or duration of the positive portion of the rectangular control pulse $U_{Stg}$.

The electron beam consecutively passing through the slots of the slotted grid 508 and reaching the common anode 504 represents the consecutively effective branch lines of a delay line time-controlled by the control voltage $U_{Stg}$ applied to the control grid 507. The positive control voltage portion allowing the electron beam to pass correspond as to its width or duration to the number and delaying time of those channels, or slots in this case, as are used to release the required pulses, while the negative control voltage portion blocking the passage of the electron beams will have to be of such pulse width or duration as corresponds to the number and delaying time of such channels or slots which are not to release any pulses.

The control voltage applied to the control grid 507 can be either bipolar or unipolar, positive or negative. In this case, as also in the embodiments above described, the control pulse at the control grid and the original pulse $I_E$ to be multiplied can be synchronized with each other for instance by means of multivibrators. Also it is possible to release both pulses by a common starting pulse. The width or duration of the control pulses at the control grids 407, 507 can be adjusted by electronic or other known methods for dimensioning the width of pulses of multivibrators or the like.

Such means for dimensioning or adjusting the width or duration of blocking or non-blocking pulses may be used with all embodiments shown in the FIGS. 3 to 5.

In all embodiments it is possible to produce the complementary number of pulses by reversing the polarity of the control voltages. This feature of the invention is of importance for its use in electronic computing devices.

The delay line shown in FIG. 6 has delay members 601 to 610 between which there are unidirectional conductor elements 631 to 639, respectively, in the form of rectifiers, which latter may simultaneously serve as amplifiers or be supplemented by such. The amplifying members can be either magnetic amplifiers, transistor circuits or the like. There are junction points of the branch lines 611 to 619 serving to introduce the pulses to be multiplied are arranged respectively between the delay members and the respectively next following rectifier. There are also condensers 641 to 649 inserted in the branch lines 611 to 619, such condensers, if suitably dimensioned, being able to bring about a differentiation of the input pulses.

In the embodiment shown here the junction points for introducing the pulses into the delay line are respectively identical with the junction points for delivering the output pulses, this however not being absolutely necessary. The junction points for the output pulses are respectively connected by branch lines 651 to 659 to a common output line 660, at the end of which there are arranged two oppositely polarized unidirectional conductor elements 661, 662, for instance diodes. The beginning and the end of the delay line are terminated by the resistances 672 and 671, respectively, correspond to the oscillatory resistance of the delay line.

The two pulses $b$ and $b'$ of reverse polarity which are made of the rectangular pulse $a$ by differentiation will therefor pass the delay line, e.g. from the input $c$ to the left and to the right, respectively, and release at the output terminals $d$ and $e$ the positive and negative pulse series (as shown) which correspond to the regular or the complementary value of the digit value to which the input terminal C is assigned.

As may be seen from FIG. 7 the input lines 611 to 619 are connected to the verticals of an arrangement 680 of bus bars crossing each other, the horizontals of which are to be considered as being connected to a step-by-step switch system via blocking members 690 to 699, respectively. At the crossings of the bus bars the numerical values of factors to be multiplied can be selected by setting or operating contacts interconnecting horizontal and vertical bars. The step-by-step switch system delivers to the horizontal bars consecutively pulse series, which correspond to the other factor of a multiplication and which can be generated in any desired way. It is also possible to arrange another similar bus bar system connected with the outputs $d$, $e$ of the output line 660 in which the above mentioned other factor or even a third factor may be set. For the introduction of one of the factors one can also provide a bus bar system with only one horizontal bar crossing a plurality of vertical ones, with a single pulse generator being connected to that one horizontal bar, these single pulses generating in the pertaining delay line pulse series corresponding to the factor set up in the bus bar system.

What we claim is:

1. A device for generating pulse sequences wherein the number of pulses is the multiplication product of a whole number of input pulses and a preselectable whole number factor, comprising, in combination, as a pulse repeating means an electron beam producing cathode ray tube means having an input for receiving a primary pulse and beam deflector means connected with said input for deflecting the beam in response to said primary pulse and having parameters predetermining the deflection time required for a primary pulse to cause the beam to be deflected from an initial direction transversely across the tube to a final direction at maximum deflection, said cathode ray tube means having a plurality of anode means located in consecutive alignment along the path of said beam to be successively impinged by said beam during its deflection from said initial to said final direction, a plurality of anode leads respectively connected to said anode means for delivering said primary pulse, during said deflection of said beam, repeatedly in timed succession through said individual anode leads, respectively, as a series of as many successive pulses as there are anode means; common output means connected with all of said anode leads for receiving therefrom any of said pulses and for delivering a sequence of said successive pulses; and control means adjustable for selectively blocking the delivery of any desired number of pulses out of said series of successive pulses furnished by said anode leads, whereby at said output means a sequence of pulses is available, the number of pulses whereof is the multiplication product of the number of introduced primary pulses, as one factor, and of the number of not blocked pulses derived from said anode leads, as the other factor.

2. A device for generating pulse sequences wherein the number of pulses is the multiplication product of a whole number of input pulses and a preselectable whole number factor, comprising, in combination, as a pulse repeating means an electron beam producing cathode ray tube means having an input for receiving a primary pulse and beam deflector means connected with said input for deflecting the beam in response to said primary pulse and having parameters predetermining the deflection time required for a primary pulse to cause the beam to be deflected from an initial direction transversely across the tube to a final direction at maximum deflection, said cathode ray tube means having a plurality of anode means located in consecutive alignment along the path of said beam to be successively impinged by said beam during its deflection from said initial to said final direction, a plurality of anode leads respectively connected to said anode means for delivering said primary pulse, during said deflection of said beam, repeatedly in timed succession through said individual anode leads, respectively, as a series of as many successive pulses as there are anode means; common output means connected with all of said anode leads for receiving therefrom any of said pulses and for delivering a sequence of said successive pulses; and control means adjustable for selectively blocking for a blocking time period shorter than said deflection time the delivery of any pulses out of said series of successive pulses furnished by said anode leads, whereby at said output means a sequence of pulses is available, the number of pulses whereof is the multiplication product of the number of introduced primary pulses, as one factor, and of the number of pulses derived from said anode leads during the time differential between said deflection time and said blocking time, as the other factor.

3. A device as claimed in claim 2, wherein said control means comprise a control grid interposed across the paths of said electron beam to said anode means, and means for applying to said control grid a potential capable of blocking said beam from reaching said anode means.

4. A device for generating pulse sequences wherein the number of pulses is the multiplication product of a whole number of input pulses and a preselectable whole number factor, comprising, in combination, as a pulse repeating means an electron beam producing cathode ray tube means having an input for receiving a primary pulse and beam deflector means connected with said input for deflecting the beam in response to said primary pulse and having parameters predetermining the deflection time required for a primary pulse to cause the beam to be deflected from an initial direction transversely across the tube to a final direction at maximum deflection, said cathode ray tube means having anode means extending transversely across said tube means along the path of said beam to be impinged thereby during its deflection, and a shielding grid extending across said path of said beam to said anode means, said shielding grid being provided with a plurality of slots located in consecutive alignment along the path of said beam to be successively passed by said beam during its deflection from said initial to said final direction for delivering said primary pulse in the form of successive impingements on said anode means, during said deflection of said beam, repeatedly in timed succession through said anode means as a series of as many successive pulses as there are slots in said shielding grid; output means connected with said anode means for receiving therefrom any of said pulses and for delivering a sequence of said successive pulses; and control means adjustable for selectively blocking the delivery of any desired number of pulses out of said series of successive pulses furnished by said anode means, whereby at said output means a sequence of pulses is available, the number of pulses whereof is the multiplication product of the number of introduced primary pulses, as one factor, and of the number of not blocked pulses derived from said anode means, as the other factor.

5. A device for generating pulse sequences wherein the number of pulses is the multiplication product of a whole number of input pulses and a preselectable whole number factor, comprising, in combination, as a pulse repeating means an electron beam producing cathode ray tube means having an input for receiving a primary pulse and beam deflector means connected with said input for deflecting the beam in response to said primary pulse and having parameters predetermining the deflection time required for a primary pulse to cause the beam to be deflected from an initial direction transversely across the tube to a final direction at maximum deflection, said cathode ray tube means having anode means extending transversely across said tube means along the path of said beam to be impinged thereby during its deflection, and a shielding grid extending across said path of said beam to said anode means, said shielding grid being provided with a plurality of slots located in consecutive alignment along the path of said beam to be successively passed by said beam during its deflection from said initial to said final direction for delivering said primary pulse in the form of successive impingements on said anode means, during said deflection of said beam, repeatedly in timed succession through said anode means as a series of as many successive pulses as there are slots in said shielding grid; output means connected with said anode means for receiving therefrom any of said pulses and for delivering a sequence of said successive pulses; and control means adjustable for selectively blocking for a blocking time period shorter than said deflection time the delivery of any pulses out of said series of successive pulses furnished by said anode means, whereby at said output means a sequence of pulses is available, the number of pulses whereof is the multiplication product of the number of introduced primary pulses, as one factor, and the number of pulses derived from said anode means during time differential between said deflection time and said blocking time, as the other factor.

6. A device for generating a sequence of pulses the total number of which is equal to the multiplication product of a whole number of input pulses and a preselectable whole number factor, comprising, in combination, a pulse-repeating means having input means for receiving said input pulses, and pulse output means for delivering upon receipt of each single input pulse a predetermined number of output pulses spaced in time over a predetermined time period; gate means arranged between said input means and said pulse output means and adapted to be either in pulse-passing condition or in pulse-blocking condition and to be in one of said conditions during application of a controlling impulse while being in the other of said conditions in absence of said controlling impulse; means for furnishing such controlling impulse with a duration adjustable between zero and said predetermined time period; and means for adjusting said duration of said controlling impulse in correspondence with said preselectable whole number factor and for actuating said means for furnishing said controlling impulse with such adjusted duration during each of said predetermined time periods, whereby during each of said time periods only a number of output pulses corresponding to said preselectable whole number factor will pass through said output means so that upon receipt of a number of input pulses corresponding to said whole number of input pulses, the total number of output pulses will be characteristic of the multiplication product of said whole number and said preselectable whole number factor.

7. A device for generating pulse sequences the total number of which is equal to the multiplication product of a whole number of input pulses and a preselectable whole number of factor, comprising, in combination, a delay line means having input means for receiving said input pulses and having parameters predetermining the travel time required for an input pulse to pass therethrough, said delay line means having a series of consecutively arranged, substantially non-reactive channel means branched off therefrom for delivering, during said travel time required for said input pulse passing therethrough, in timed succession through one after the other of said consecutive channel means, respectively, a series of as many successive output pulses as there are branched-off channel means; gate means for controlling the passage of said output pulses through said channel means, said gate means being capable of changing from a normal pulse-passing condition to a pulse-blocking condition in response to a time control pulse of predetermined potential applied thereto; means for furnishing a time control pulse of selectable duration and for applying such time control pulse with a selected duration to said gate means, substantially simultaneously with said input pulse, for blocking the passage of said output pulses through said channel means for a blocking time period depending upon the duration of said time control pulse, while leaving said gate means in pulse-passing condition for those of said channel maens which are reached by said output pulses only after the termination of said blocking time period; and common output means connected with all of said channel means for receiving therefrom any of said output pulses passed through said gate means when left in pulse-passing condition after termination of said blocking time period and for delivering a corresponding sequence of output pulses, whereby at said output means a sequence of output pulses is available, the number whereof is the multiplication product of the number of input pulses introduced, as one factor, and of the number of output pulses derived from the not-blocked channel means during the time differential between said travel time and said blocking time period, as the other factor.

8. A device as claimed in claim 6, wherein said means for furnishing a time control pulse comprise electronic means for delivering said control pulse as a saw-tooth voltage pulse of predeterminable shape and dimension.

9. A device as claimed in claim 6, wherein said gate means comprise a plurality thereof respectively connected in said branched-off channel means and respectively connected to said means for furnishing a time control pulse for the purpose of application of said control pulse to said plurality of gate means.

10. A device as claimed in claim 6, said gate means being connected within said common output means at the end thereof.

11. A device as claimed in claim 6, wherein said means for furnishing a time control pulse include monostable multivibrator means for furnishing said time control pulse in the form of a pulse of predeterminable duration.

12. A device as claimed in claim 6, wherein said delay line means is composed of a plurality of delay elements, said branched-off channel means being connected respectively to junction points between said delay elements.

13. A device as claimed in claim 12, wherein said input means comprise means for selectably connecting said input means to any desired junction point between said delay elements.

14. A device as claimed in claim 13, wherein said input means comprise means for applying positive and negative primary pulses, and wherein each of said delay elements comprises valve means for determining the direction of flow of said primary pulse from said particular junction point, where said primary pulse is applied to said delay line means, through the portions thereof separated by said particular junction point, said output means being split at its end into two branch output lines, each of said branch output lines including valve means for determining the direction of flow of the pulses delivered therethrough, said valve means in said branch output lines being reversed with respect to each other so that pulses delivered through one of said branch output lines are those derived from positive primary pulses, and those delivered through the other one of said branch output lines are those derived from negative primary pulses.

15. A device as claimed in claim 14, wherein said valve means include amplifier means.

16. A device as claimed in claim 14, wherein said input means include means for applying said positive and negative primary pulses with a predetermined time interval therebetween.

17. A device as claimed in claim 14, wherein said input means include differentiating means for deriving from a primary pulse said positive and negative pulses by differentiation.

18. A device as claimed in claim 14, wherein said delay line means comprises ten delay elements whereby the numbers of positive and negative pulses delivered through said branch output lines, respectively, are tens-complements relative to each other.

19. A device as claimed in claim 13, wherein said input means comprise a matrix-type bus bar system, one set of bus bars thereof being connected to said junction points between said delay elements.

20. A device as claimed in claim 19, wherein said bus bar system includes means for selectably setting up interconnections between elements of said one set of bus bars and elements of the other set of bus bars of said system, for permitting said primary pulses to be introduced through said other set of bus bars, and the number of pulses derived from said branch-off line means and forming the second factor, to be predetermined by the setting of said interconnections.

21. A device as claimed in claim 20, including electronic step-by-step switch means connected to said other set of bus bars for introducing a sequence of primary pulses, their number constituting the first factor of the multiplication.

22. A device as claimed in claim 21 wherein said other set of bus bars is reduced to a single bus bar.

References Cited in the file of this patent

UNITED STATES PATENTS

| | | |
|---|---|---|
| 1,929,067 | Hund | Oct. 3, 1933 |
| 2,173,193 | Zworykin | Sept. 19, 1939 |
| 2,236,134 | Gloess | Mar. 25, 1941 |
| 2,361,766 | Hadekel | Oct. 31, 1944 |
| 2,516,888 | Levy | Aug. 1, 1950 |
| 2,521,952 | Stephenson | Sept. 12, 1950 |
| 2,565,486 | Feinstein et al. | Aug. 28, 1951 |
| 2,577,141 | Mauchly et al. | Dec. 4, 1951 |
| 2,588,287 | Podskalsky | Mar. 4, 1952 |
| 2,609,455 | Bachelet | Sept. 2, 1952 |
| 2,616,965 | Hoeppner | Nov. 4, 1952 |
| 2,619,636 | Veaux | Nov. 25, 1952 |
| 2,649,505 | Ransom | Aug. 18, 1953 |
| 2,651,677 | Lair | Sept. 8, 1953 |
| 2,651,740 | Lair | Sept. 8, 1953 |
| 2,662,176 | Jonker | Dec. 8, 1953 |
| 2,667,633 | Mandel | Jan. 26, 1954 |
| 2,772,390 | Woodruff | Nov. 27, 1956 |
| 2,876,350 | Kuchinsky | Mar. 3, 1959 |
| 2,896,112 | Allen et al. | July 21, 1959 |